(12) United States Patent
Endo et al.

(10) Patent No.: US 7,762,890 B2
(45) Date of Patent: Jul. 27, 2010

(54) GAME DEVICE, GAME PROCESSING METHOD AND RECORDING MEDIUM HAVING A PROGRAM RECORDED THEREON

(75) Inventors: Yoshiaki Endo, Tokyo (JP); Tomohiro Nimura, Tokyo (JP); Kazuyoshi Tsugawa, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 343 days.

(21) Appl. No.: 11/360,323

(22) Filed: Feb. 22, 2006

(65) Prior Publication Data

US 2006/0160592 A1  Jul. 20, 2006

Related U.S. Application Data

(62) Division of application No. 09/663,347, filed on Sep. 15, 2000, now Pat. No. 7,033,275.

(30) Foreign Application Priority Data

Sep. 16, 1999 (JP) .................................. 11-262745
Mar. 30, 2000 (JP) ................................. 2000-95918

(51) Int. Cl.
*A63F 13/00* (2006.01)
(52) U.S. Cl. .................................. 463/30; 463/1; 463/9
(58) Field of Classification Search .................... 463/1, 463/9, 7, 10, 23, 30–32; 273/459–461; 345/419
See application file for complete search history.

(56) References Cited

U.S. PATENT DOCUMENTS

| | | | |
|---|---|---|---|
| 5,390,937 A | 2/1995 | Sakaguchi et al. | |
| 5,649,862 A | 7/1997 | Sakaguchi et al. | |
| 6,126,545 A | 10/2000 | Takahashi et al. | |
| 6,132,315 A | 10/2000 | Miyamoto et al. | |
| 6,168,524 B1 | 1/2001 | Aoki et al. | |
| 6,203,431 B1 | 3/2001 | Miyamoto et al. | |

(Continued)

FOREIGN PATENT DOCUMENTS

JP    11-207032    1/1998

(Continued)

OTHER PUBLICATIONS

Gamers.com, Final Fantasy Overview for the US release for the Playstation, Sep. 9, 1999.

(Continued)

*Primary Examiner*—Dmitry Suhol
*Assistant Examiner*—Robert Mosser
(74) *Attorney, Agent, or Firm*—Intellectual Property Law Group LLP; Juneko Jackson; Otto O. Lee

(57) ABSTRACT

An object of this invention is to provide a game device that can add much to the production of the game. The invention is a game device for displaying a game image which expresses a virtual three-dimensional space, which is characterized in that it displays the first action scene between the first player character and the first enemy character and the second action scene between the second player character and the second enemy character based on the predetermined camera angle to project the first player character and the first enemy character related to the predetermined command which is given to the first player character by the player.

5 Claims, 15 Drawing Sheets

U.S. PATENT DOCUMENTS

| | | |
|---|---|---|
| 6,220,962 B1 | 4/2001 | Miyamoto et al. |
| 6,241,609 B1 | 6/2001 | Rutgers |
| 6,354,940 B1 | 3/2002 | Itou et al. |
| 6,439,998 B1 | 8/2002 | Itou |
| 6,454,653 B1 | 9/2002 | Kawazu |
| 6,488,586 B1 * | 12/2002 | Kobayashi et al. ............ 463/43 |

FOREIGN PATENT DOCUMENTS

| | | |
|---|---|---|
| JP | 11-093219 | 2/1999 |
| JP | 2000-245968 A | 2/1999 |
| JP | 11-197359 | 7/1999 |

OTHER PUBLICATIONS

Squaresoft, Final Fantasy VIII Owner's manual, Game release date U.S. Sep. 9, 1999, JP Feb. 11, 1999, pp. 1-45.

"SaGa Frontier 2," Shukan Famitsu: Nov. 27$^{th}$ Issue, Ascii Corporation, Nov. 27, 1998, vol. 13, No. 48, pp. 192-193.

Excerpt Translation of Office Action dated Dec. 10, 2008 for corresponding Japanese Application No. 2000-095918, 4 pages.

English Translation of Decision of Rejection dated Apr. 16, 2009 for corresponding Japanese Application No. 2000-095918, 3 pages.

"Gotchakyara SLG Finally Revives!! First Queen The New World," "Mycom BASIC Magazine," Depa Newspapers, Jul. 1, 1999, vol. 18, No. 7, p. 135, 136.

* cited by examiner

SUBJECT TO DAMAGES

USUAL DAMAGES

NOT SUBJECT TO DAMAGES

>>>> THE LARGER THE NUMBER OF ">" IS, THE MORE EFFECTIVE THE DAMAGES ARE GIVEN.

FIG.15

| MENU OF WEAPONS·SHIELDS | | PERMITTED NUMBER USED IN 1 GAME (BULLET NUMBERS) |
|---|---|---|
| CANON | 7 INCH MAIN GUN | 3 |
| TORPEDO | SWALLOW TORPEDO | 5 |
| MG | MACHINE GUN | 30 |
| DEFENSE | SHIELD | 7 |

GAME DEVICE, GAME PROCESSING METHOD AND RECORDING MEDIUM HAVING A PROGRAM RECORDED THEREON

CROSS REFERENCE

This is a divisional of U.S. application Ser. No. 09/663,347, matured into U.S. Pat. No. 7,033,275 and filed on Sep. 15, 2000 which is hereby incorporated herein by reference. Application Ser. No. 09/663,347 claims benefit of Japan Application no. 11-262745, filed on Sep. 16, 1999 and Japan Application no. 2000-095918, filed on Mar. 30, 2000.

BACKGROUND OF THE INVENTION

1. Field of the Invention

The present invention generally relates to a game device and a game processing method. Particularly it relates to a game device for role-playing games and its game processing method.

2. Description of the Related Art

A role-playing game has been known for some time to be a game whose player can play the game by developing its scenario as if he or she were the character displayed on the screen. In role-playing games, the scenario generally develops when the player gives predetermined commands to the character on his or her side in consideration of the present situation.

Pursuant to the improvement of hardware performance, in recent years, production effects of the game are enhanced by providing game images of characters acting in a virtual three-dimensional space with three-dimensional graphics.

These three-dimensional graphics express objects three-dimensionally by calculating the spatial position of objects which are in the line-of-sight direction from the viewpoint position (sometimes referred to as "projection center position") in a virtual three-dimensional space based on three-dimensional data for expressing objects, and by performing image processing such as rendering. In short, a game using three-dimensional graphics expresses the player's character or any other object as three-dimensional as seen from the viewpoint position and offers the game image which expresses a virtual three-dimensional space by moving one's viewpoint or line of sight along the player's operation or game scenes. The game image from such viewpoint position is metaphorically called camera angle and the variation of this camera angle is called camera work.

The interest in a role-playing game often comes from not only its story but also its image displayed. This is why the kind of game image that should be offered in creating games (game programs) is extremely important.

Nevertheless, in conventional role-playing games, only the characters related to predetermined commands move in correspondence with such commands. Therefore, the characters which are not related to the commands would not move and it was very unnatural to a player who is watching a game image.

For example, when a player gives his or her character a command to attack a specific enemy character, the battle scene of these characters is displayed. However, in conventional role-playing games, the characters which are not given any commands only absent-mindedly stand by, which makes the game image seem very unnatural.

Moreover, conventional role-playing games are structured by displaying only the characters that a player can operate and omitting the characters that should rightfully be displayed. And when such characters need to be displayed, they are suddenly displayed by switching scenes, etc. For that reason, the characters that are not displayed in the first scene of a game suddenly appear, which seems very unnatural to a player who is watching a game image.

Thus, an object of this invention is to provide a game device displaying the game image of a role-playing game in which the characters unrelated to any commands which the player gives can look as if they are moving.

It is also an object of this invention to provide a game device in which new characters enter or leave the current scene without a sense of incompatibility.

Hereinafter explained is the processing operation of a game device for controlling the relationship between the characters while they are fighting in an electronic game. When there is a fight between a player and a game device (a game processing computer), a player character controlled by the player attacks an enemy character controlled by the computer, or, the enemy character controlled by the computer attacks the player character. Here, while the player character attacks the enemy character, the enemy character is attacked by the player character, and in the opposite case, the player character is attacked by the enemy character. A process of reciprocal attacks between the enemy character and the player character is called 1 phase. For example, if there are 3 player characters, reciprocal attacks are conducted 3 times in turn between each of the 3 player characters and the enemy character, so there will be 3 phases. The total of these 3 phases corresponds to a stage called 1 turn. In short, 1 turn means a game stage for the successive attacks conducted between the enemy character and the player character. Some TV games and computer games are constituted to implement a game having a plurality of turns. Furthermore, when a fighting game is conducted among players, the enemy characters are controlled by other players, not by the automatic control of the computer.

Regarding conventional simulation games of this type, when making attacks in the amount of 1 turn in 3 phases against the enemy character, for example, 1 character selected for each 1 phase attacks the enemy character or conducts defenses, and thus, the operation in the amount of 3 phases is implemented by the 3 character bodies.

However, the conventional game devices of this type only processes of whether the attacks succeeded or not among the player and the enemy characters, and there was no such arrangement that changes/adjusts the characteristic of a phase based on the development of a game, such as making the offensive power of the player character against the enemy character relatively stronger than the defensive power against the enemy character, or doing the opposite in a different phase, etc.

Therefore, the object of the present invention is to provide an image processing device, especially a game device, having a variety in the characteristics of phases and also in the developments of the game scenes by giving the player a variety of responses in 1 phase, for example, the player's selection of weapons of various characteristics and his/her selection of attacks and defenses, etc.

SUMMARY OF THE INVENTION

The present invention devised in view of the aforementioned problems confronted by the conventional art is specified below.

This invention is a game device or a game processing method for displaying a game screen which expresses a virtual three-dimensional space, wherein the game device displays the first action scene between the first player character and the first enemy character and the second action scene between the second player character and the second enemy character based on the predetermined camera angle to project the first player character and the first enemy character related to the predetermined command which is given to the first player character by the player.

Here, the predetermined command is the attacking command for the first player character attacking the first enemy character.

Moreover, this invention is characterized in that it changes the attribute value of the first player character and/or the first enemy character based on the predetermined commands.

Further, the first action scene is characterized in that it displays the damage of the player first character and/or the first enemy character based on the attribute value that changes in accordance with the predetermined commands.

Furthermore, this invention is characterized in that it displays the second action scene when the second player character and the second enemy character are arranged in the game screen decided based on the predetermined camera angle.

And this invention is a game device for displaying a game screen which expresses a virtual three-dimensional space, wherein the game device displays the second player character in the first game screen and then gradually changes the first game screen into the second game screen when the player gives the first player character a predetermined command and the first game screen displaying the first player character changes into the second game screen displaying the first player character and the second player character.

Here, the game device is characterized in that it displays the second player character entering into the first game screen from the outside of the screen. Moreover, the game device is characterized in that it changes the first game screen into the second game screen and eliminates the second player character from the second game image and then gradually changes the second player character in the first game screen.

The apparatus invention may be considered an invention of method, and vice versa. Furthermore, this invention is also a recording medium storing a program for making a game device realize predetermined functions.

The recording medium includes memories such as RAM, ROM, etc. as well as a hard disc (HD), DVD-RAM, a flexible disc (FD), CD-ROM, etc. And the game device also includes computers and the like where a central processing unit such as a CPU or MPU interprets by conducting prescribed processing steps.

BRIEF DESCRIPTION OF THE DRAWINGS

FIG. 15 is one operation screen according to the other embodiment of the present invention.

DESCRIPTION OF THE PREFERRED EMBODIMENTS

Embodiments of the present invention are now explained with reference to the relevant drawings.

Embodiment 1

Figure 1:
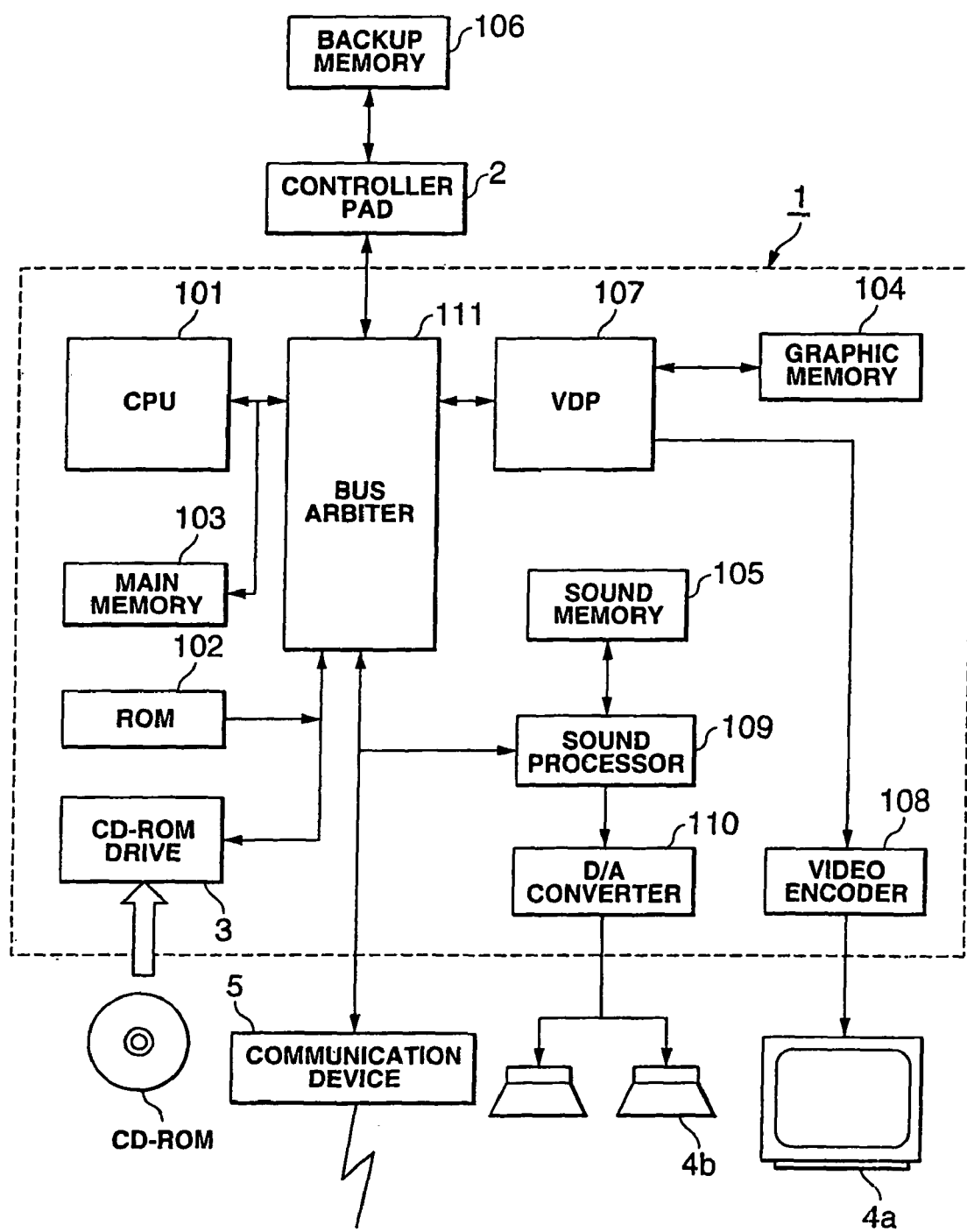
FIG. 1 is a block diagram showing the formation of a game device pertaining to the present invention.

FIG. 1 is a block diagram showing the generation of a game device pertaining to the present invention. In FIG. 1, a game device pertaining to the present invention equips a control unit 1 mainly formed from a CPU 101 and the like, an input unit 2 for users to input operational signals into the control unit, an external storage unit 3 which stores an operating system ("OS"), an application program (game program), etc. and inputs these programs into the control unit if necessary, an output unit 4 which is composed of a display unit 4a to provide images and sounds to users, and a speaker 4b. It also equips a communication unit 5 to send data to and receive them from other computers and other game devices through a telephone line and so forth. In addition, the external storage unit 3 is not necessarily limited to a CD-ROM as shown. It can be a recording medium and the like, which is capable of writing and retaining data from the control unit 1.

When the power is turned on in order to start a game, a boot program loader, not shown, loads a boot program (sometimes referred to as initial program) stored on a ROM 102 into the CPU 101 and the CPU 101 executes the boot program. Following this boot program, the CPU 101 loads all or necessary parts of the OS, which are stored on a CD-ROM, etc., into the main memory 103 and executes the OS.

Under the control of this OS, the CPU 101 loads all or the necessary parts of the application program (hereinafter sometimes simply referred to as the "program") into the main memory 103 and if necessary, it also loads drawing data and image data, which are stored on a CD-ROM, into a graphic memory 104. Moreover, it loads sound data into a sound memory 105.

Under the control of the OS, the CPU 101 executes the application program (game program) that is stored in the main memory 103. The data accompanied by the execution of the application program are written and referred to when necessary. A backup memory 106 stores data to retain the former state even if the power is shut off because of the suspension of a game.

Furthermore, in this embodiment, the OS, the application program, etc. are provided by the CD-ROM but they can be provided by, for example, other computers through a ROM or a network.

A video display processor ("VDP") 107 reads the drawing data necessary for displaying images stored in the graphic memory 104, processes a wide variety of information (the image processing) based on the data or orders from the CPU 101 that executes the application program and generates image data. For example, texture mapping, light source processing, display preference processing, etc. come under this image processing. The VDP 107 outputs to an encoder 108 in order to display the generated image data on the display unit 4a. Moreover, the generated image data can be written into, for example, a frame buffer memory and it is possible to read them from this frame buffer memory at a predetermined timing.

A sound processor 109 reads the sound data stored in the sound memory 105, processes a wide variety of information (sound processing) based on the data or orders from the CPU 101 that executes the application program and generates image data. For example, effect processing, mixing processing, etc. come under this sound processing. The pretreated sound data are converted into analog data by a D/A converter 110 and output from a speaker.

A bus arbiter 111 controls the units connected through a data channel (bus, etc.) For example, the bus arbiter 111 decides the order of priority for the units and assigns a time for the unit which occupies a bus in order to decide which unit occupies the bus.

A role-playing game in which a player develops the scenario by operating the player character of a game device generated as stated above is now explained. To put it more concretely, this role-playing game is a game in which the player characters, including a protagonist character, battle against the enemy characters in order to achieve a predetermined goal, which develops the scenario. The game program calculates parameters based on the commands given by the player and makes game scenes in accordance with the parameters.

Figure 2:
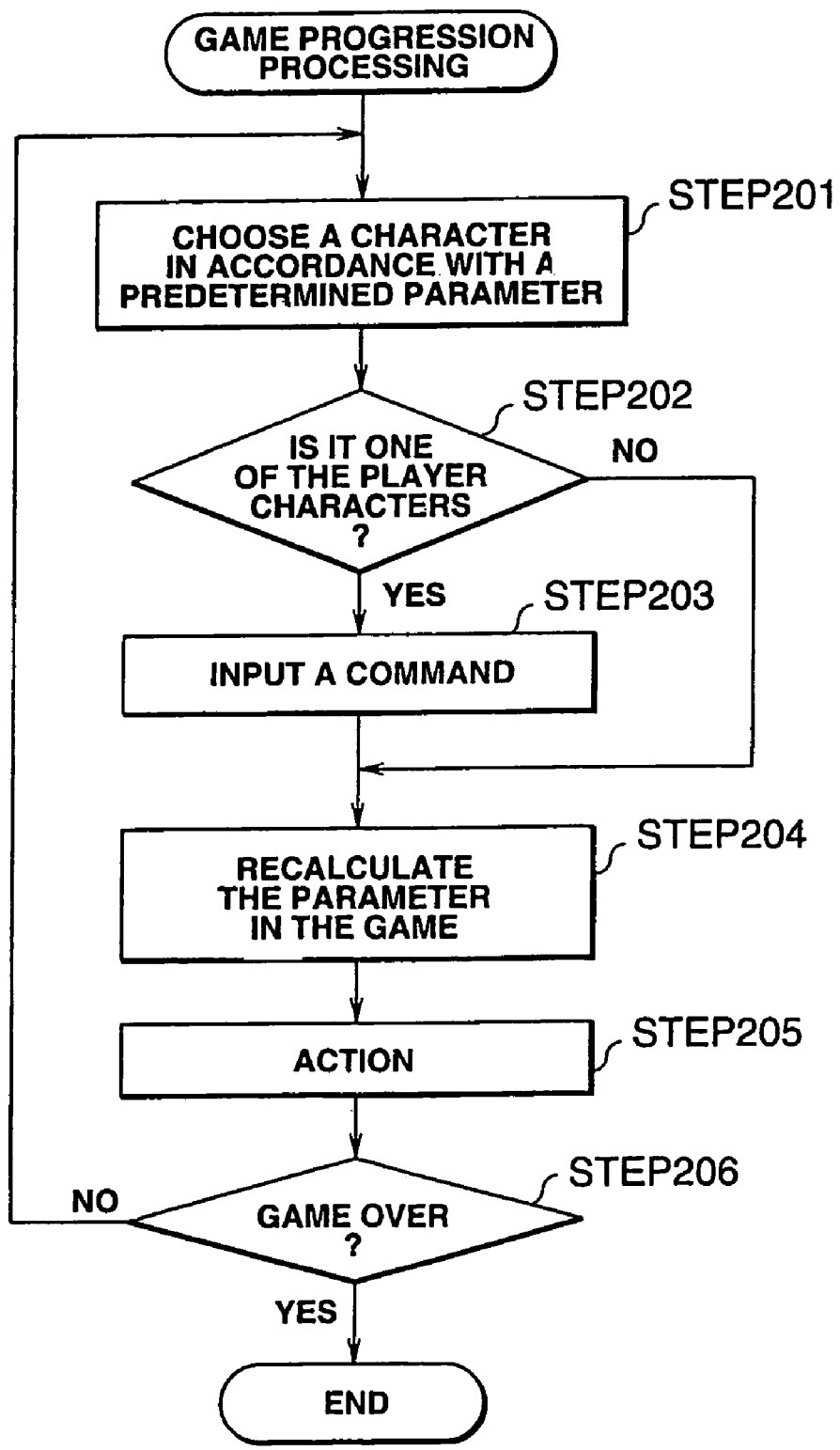
FIG. 2 is a flowchart explaining the whole operation of a game executed by a game device pertaining to the present embodiment.

FIG. 2 is a flowchart explaining the whole operation of a game executed by a game device pertaining to the present embodiment. In FIG. 2, firstly, the game device decides which character makes the next move based on the parameter showing the energy of the characters (STEP 201). This energy parameter develops the game scenario in accordance with the energy of each character. In short, the bigger the value of the energy parameter of the character is, the more the character moves. Once the game program chooses one character, it judges whether it is one of the player characters or not (STEP 202). When the chosen character turns out to be one of the player characters, it becomes possible to receive commands from the player (STEP 203). The player inputs a supposedly appropriate command seeing through the state of the game scenario at that moment. The commands suitable for the game scenario, such as "battle" against the appointed enemy character or "conversation" with the appointed player character, are arranged in advance. The player inputs predetermined commands through a user interface. Considering the value of each parameter at that moment, the game program reruns each parameter regarding the player character based on the input command. As for the enemy character, considering the value of each parameter at that moment, the game program reruns each parameter regarding the character (STEP 204). When each parameter in the game is calculated, the game device provides the player with the game image in which the chosen character looks as if it made an action (STEP 205). Thereby, the player recognizes that the game scenario has been developed through the game screen. At this time, it would be desirable if the game image of the virtual three-dimensional space is expressed on the game screen based on three-dimensional data. Moreover, the game device judges whether the parameter value calculated in STEP 204 fulfills the conditions for ending the game (STEP 206) and if it does, the game device ends the game by the predetermined processing. On the other hand, if it does not, the game device returns to STEP 201 and repeats the aforesaid processing.

Figure 3:
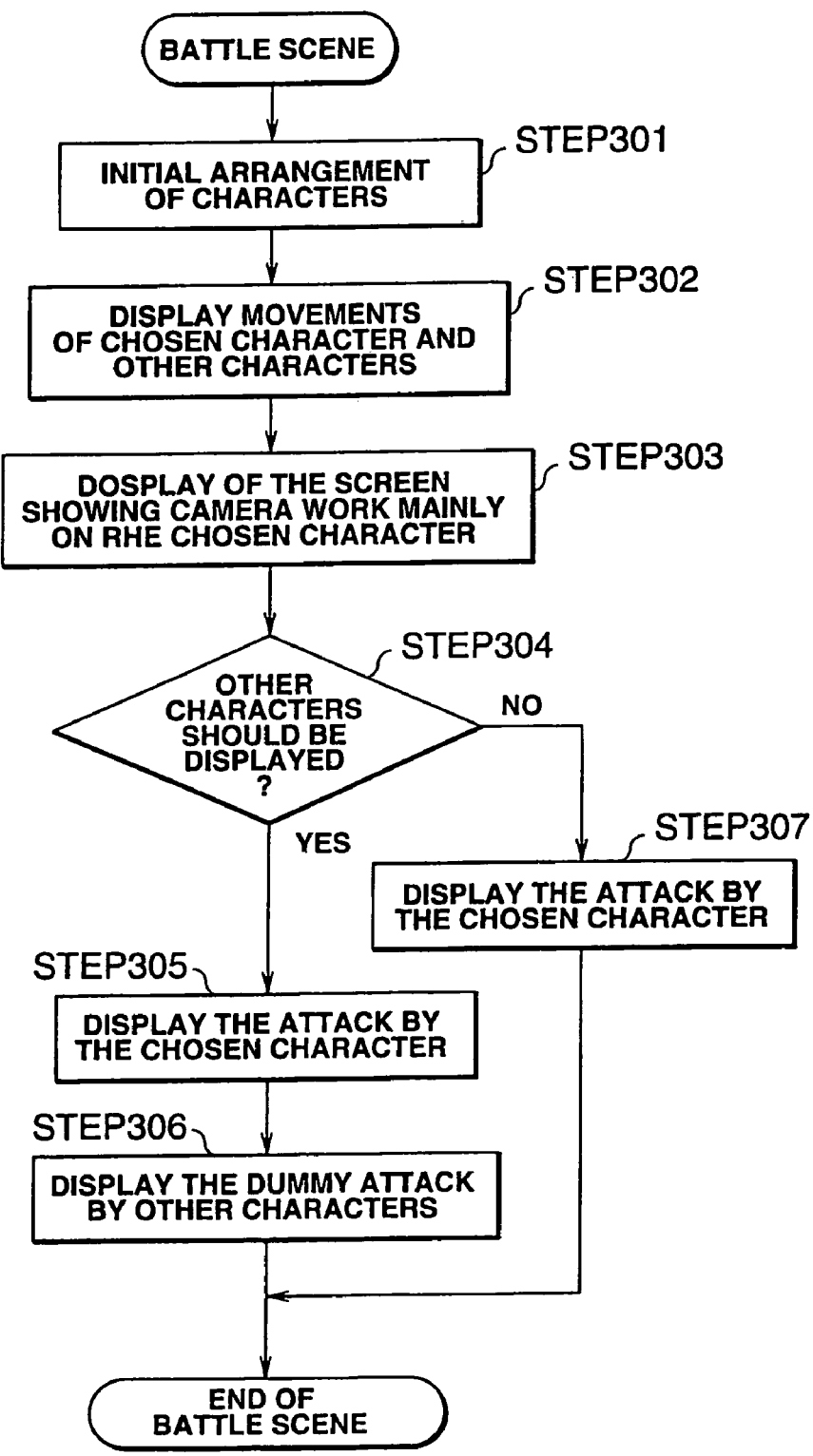
FIG. 3 is a flowchart explaining a battle scene in a game pertaining to the first embodiment.

FIG. 3 is a flowchart explaining a battle scene in a game pertaining to the first embodiment. This battle scene is executed when the player inputs the "battle command" or the chosen enemy character selects "battle" in STEP 203 of FIG. 2. Now, let it be assumed that the player gives the player character P1 "battle command" against the enemy character E1.

Figure 4:
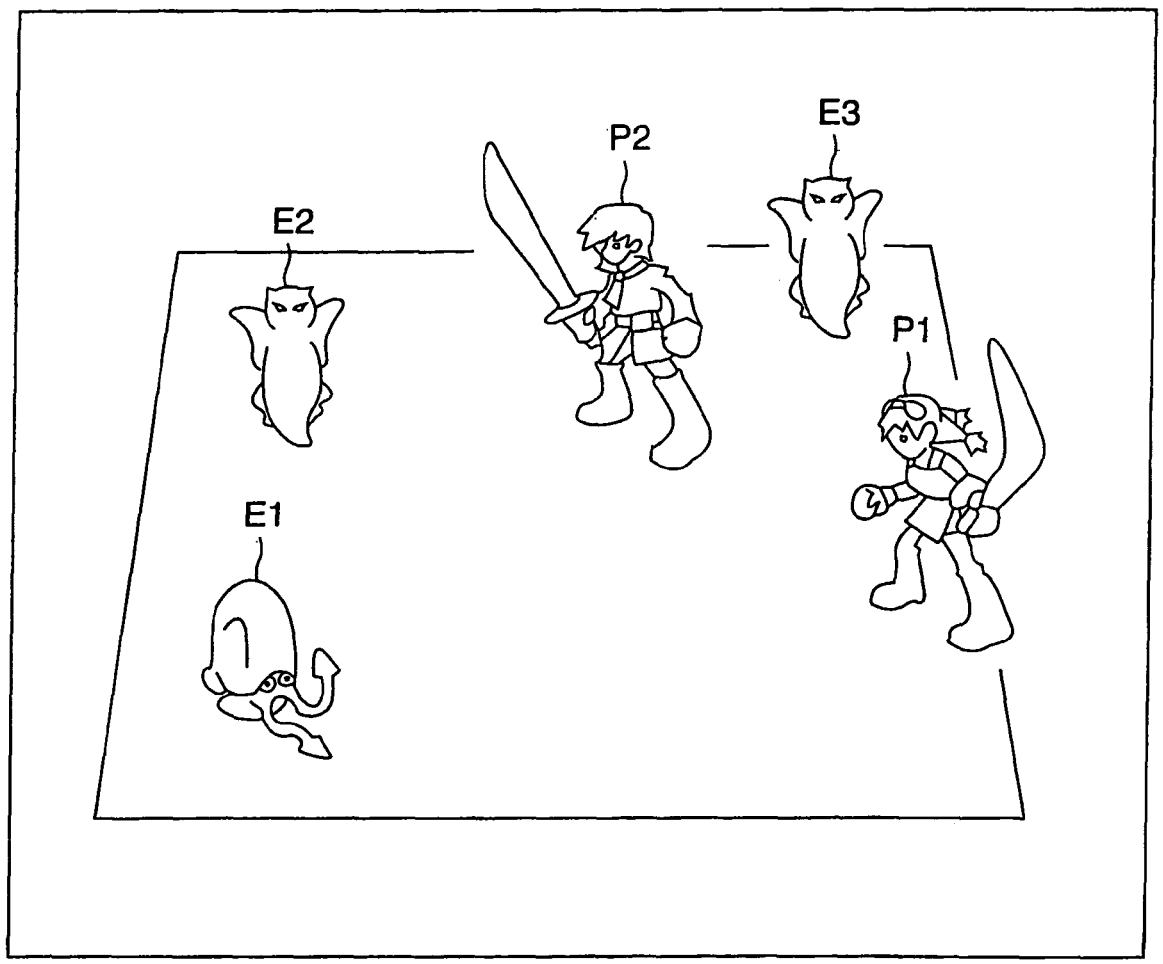
FIG. 4 is a diagram showing one game screen of the beginning of a battle.

The game device firstly displays the game image expressing the beginning of the battle between the player characters and the enemy characters, which are disposed in a virtual three-dimensional space (STEP 301). These player and enemy characters are disposed in accordance with the parameter showing the respective positions thereof. FIG. 4 is a diagram showing one game image of the beginning of a battle. It shows the game image expressing the virtual three-dimensional space; wherein the camera angle allows the player to see the positions of the player character P1, P2 and the enemy character E1, E2, E3. In this case, the enemy character E3 is disposed behind the player character P2 and the player characters and the enemy characters are jumbled together. The game device displays the game image expressing the characters and so on as three-dimensional, calculates the spatial physical relationship of them in the line of sight from the predetermined viewpoint position, and performs image processing such as rendering, based on the three-dimensional data regarding the objects expressing the characters and the positions where they act.

Figure 5:
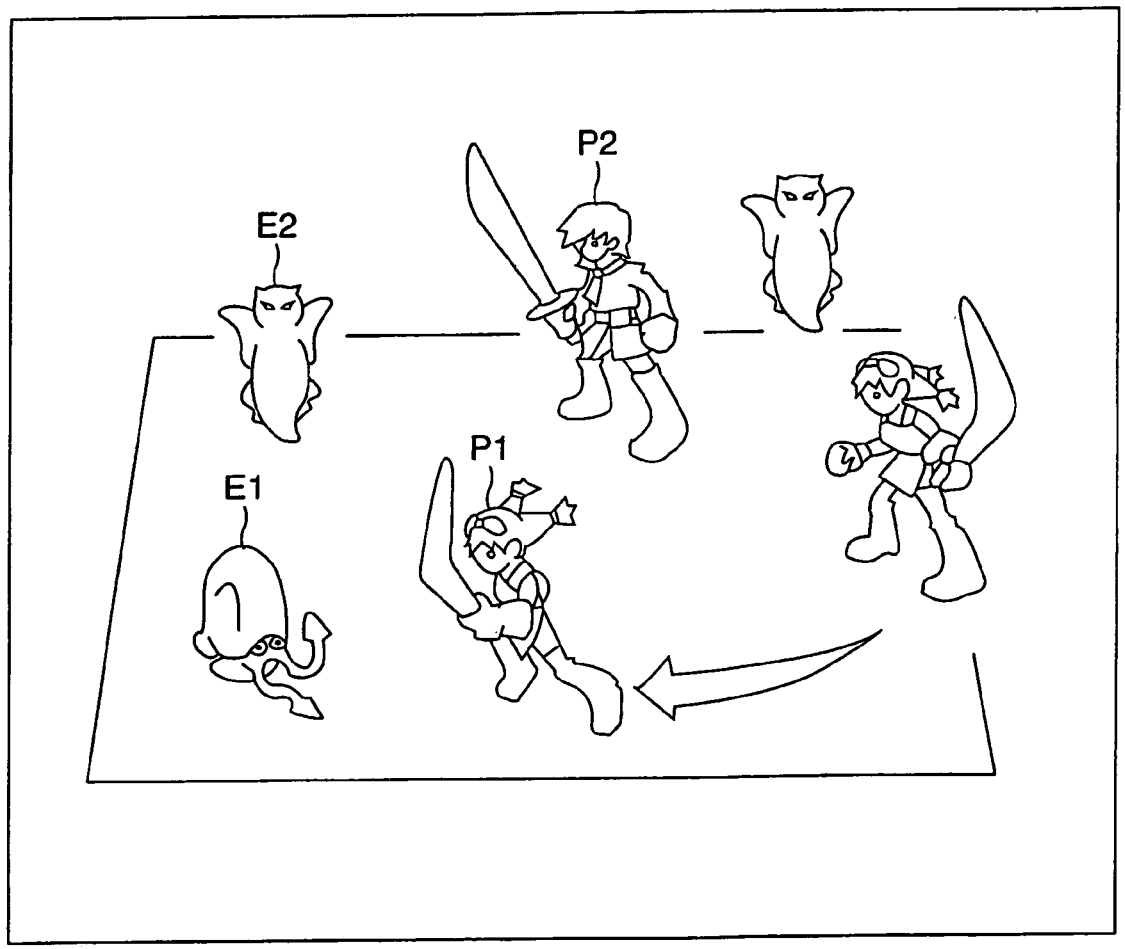
FIG. 5 is a diagram showing one game screen to explain the variations of camera work.

Now, returning to FIG. 3, the game program secondly displays the movement of the characters given the commands and if necessary, other characters as well (STEP 302). FIG. 5 shows that the player character P1 has moved in order to attack the enemy character E1 in the direction of the arrow. The game image provided for the player is the dynamic image that seems as if the characters moved in a virtual three-dimensional space. Returning to FIG. 3, the game program displays the game image expressing the virtual three-dimensional space, wherein the camera work puts stress on the player character P1 (STEP 303). The camera work is to change the positions and directions of viewpoints in the aforesaid virtual three-dimensional space. On account of that, even if the three-dimensional data themselves do not change, the game image can be changed. In addition, this camera work includes bringing a focal point close (zoom in) and bring it far (zoom out).

Figure 6:
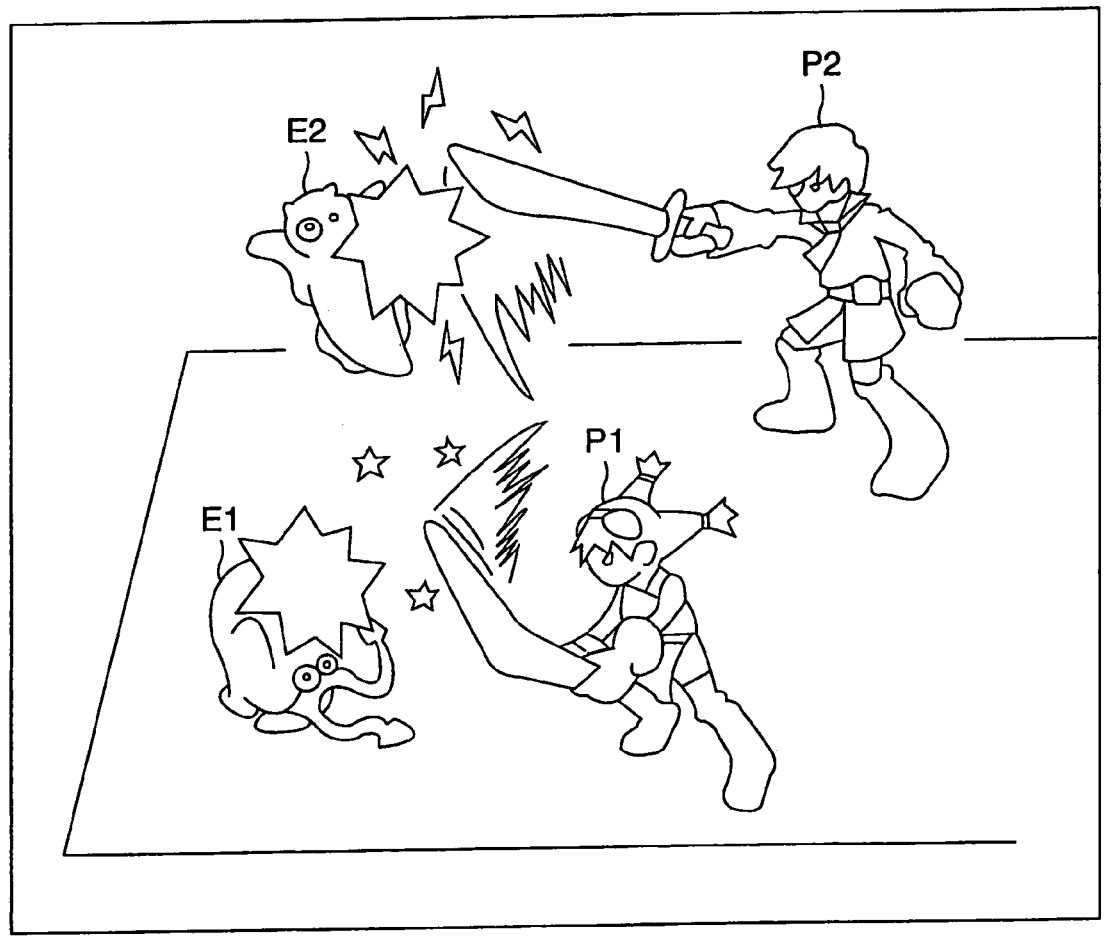
FIG. 6 is a diagram showing one game screen showing a battle scene displayed.

By this camera work the game device judges whether the characters unrelated to the command in question are to be displayed or not (STEP 304). In short, the game device judges whether the characters other than the player character P1 and the enemy character E1, the target for the attack, are to be displayed. When the game device judges that they should be displayed, it displays the attack against the enemy character E1 by the player character P1 (STEP 305) as well as the attack by the characters displayed in the game screen (STEP 306). Here, the attack against the enemy character E1 by the player character P1 is conducted based on the change of the value of the parameter regarding battle commands and in accordance with this change, the damage for the player character P1 and/or the enemy character E1 is displayed. FIG. 6 is a diagram showing one game image showing a battle scene displayed. FIG. 6 makes the player character P1 and the enemy character E1 look large by zooming them in and shows that the player character P1 is attacking the enemy character E1. Moreover it shows the battle scene between the player character P2 and the enemy character E2 behind the player character P1. The battle scene between the player character P2 and the enemy character E2 is a dummy battle scene, which does not show any damage because the value of the parameter based on the input battle commands does not change. On account of that, all the characters in the game screen move, which makes it possible to provide a more realistic game image.

On the other hand, in STEP 304, when it is judged that other characters do not need to be displayed, the game device shows only the battle against the enemy character E1 by the player character P1 (STEP 307).

When the processing for the battle scenes is finished, the game device develops the game scenario in accordance with the value of the parameter at that moment, which is displayed on the game screen.

According to the present embodiment as mentioned above, it is possible to provide a game image that looks as if the characters unrelated to the commands given by the player are also moving.

Embodiment 2

Figure 7:
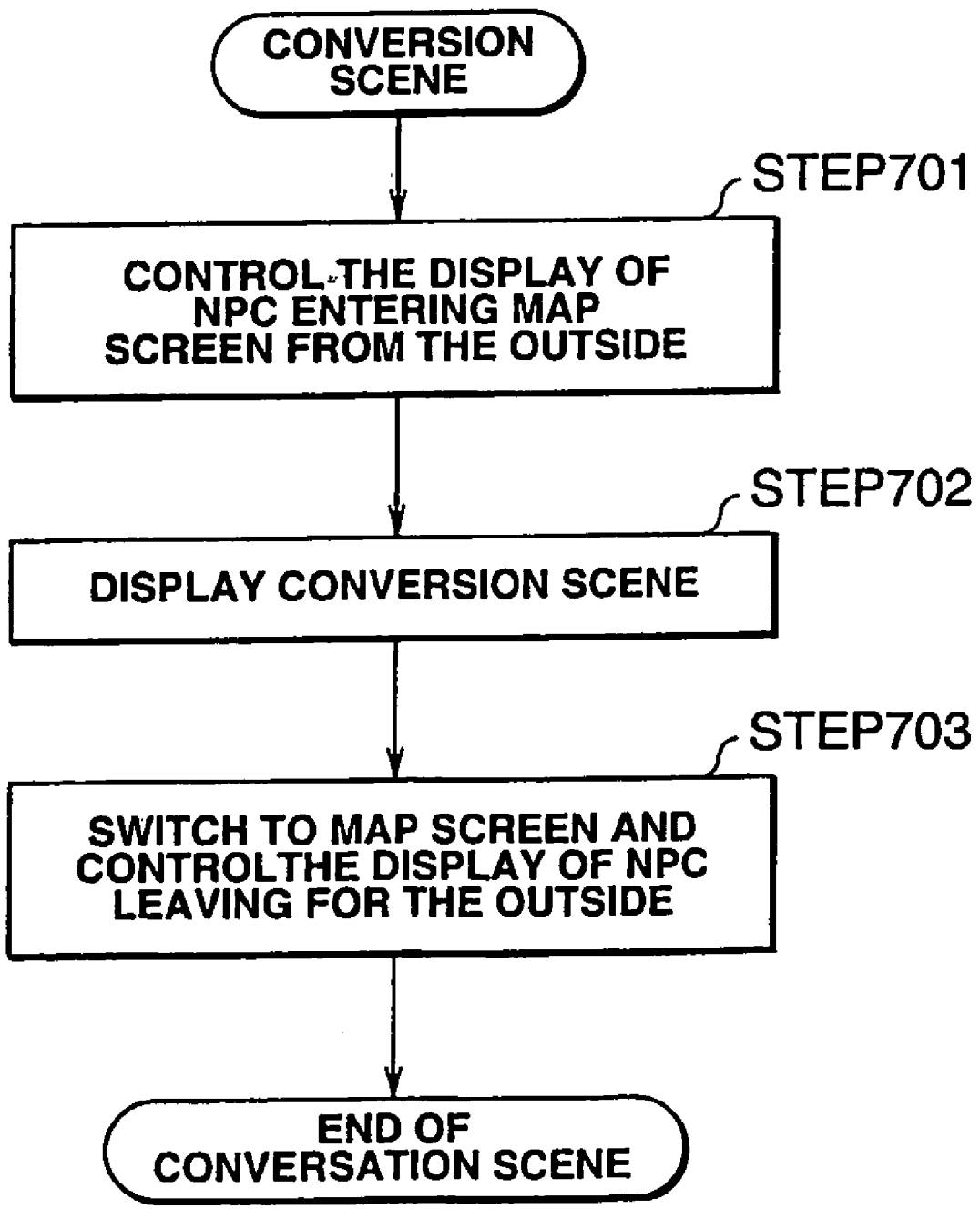
FIG. 7 is a flowchart explaining a conversation scene in a game pertaining to the second embodiment.
Figure 8:
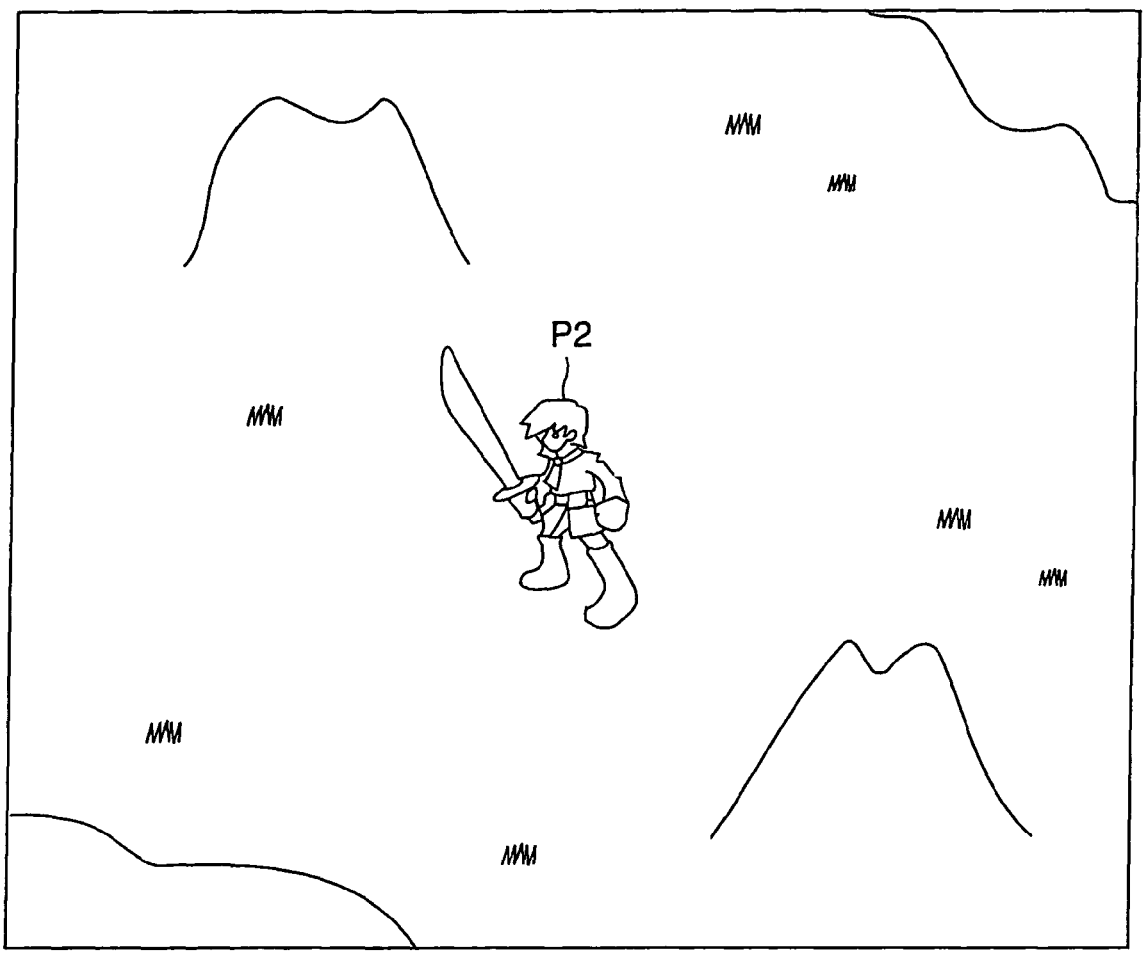
FIG. 8 is a diagram showing one game screen of a map scene where the characters move.

FIG. 7 is a flowchart explaining a conversation scene in a game pertaining to the second embodiment. In STEP 203 of FIG. 2, this conversation scene is executed when the player inputs "conversation command". Let it be assumed that the player instructs the player character P1 to have a conversation with the player character P2 by giving the "conversation command" when the player character P2 is moving within the virtual three-dimensional space as shown in FIG. 8. By the way, the game screen as shown in FIG. 8 is sometimes called a map screen.

Figure 9:
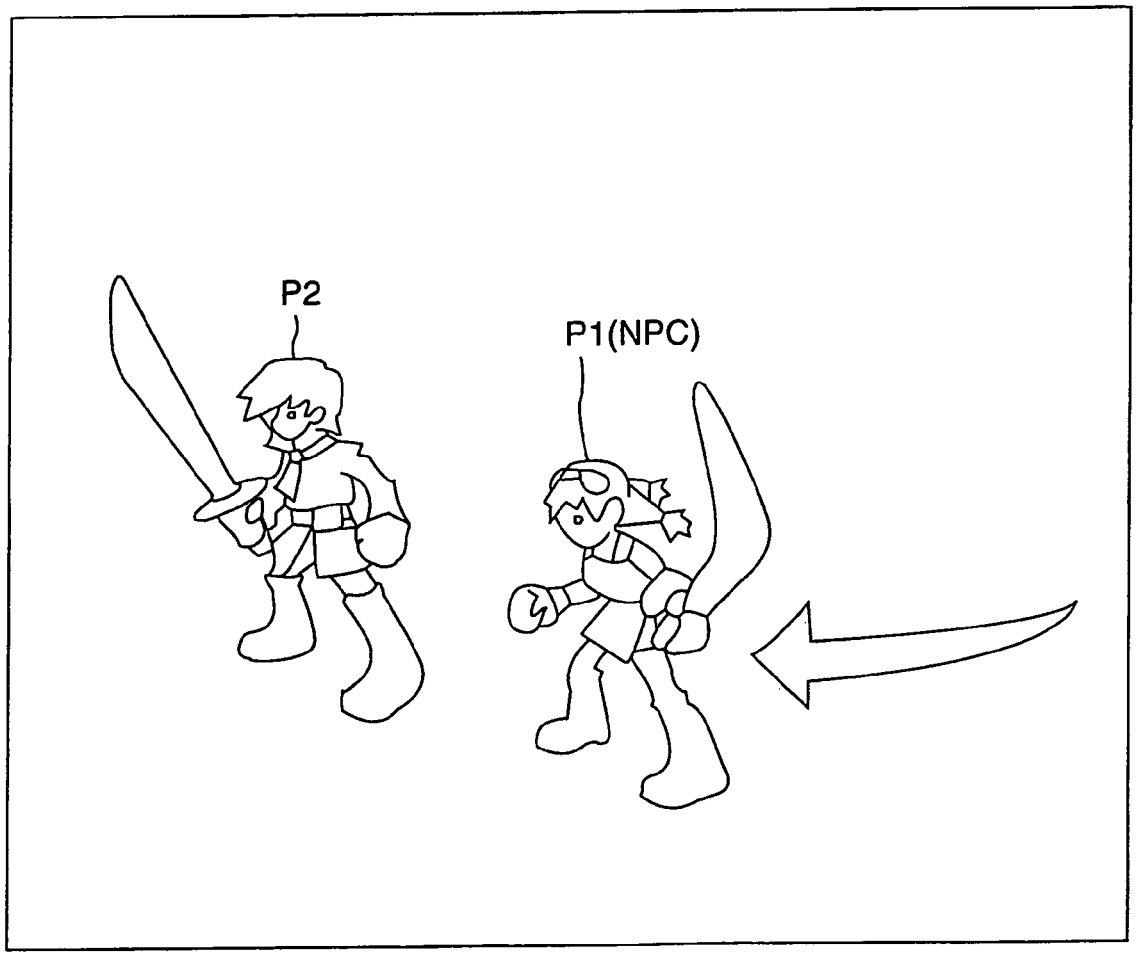
FIG. 9 is a diagram showing one game screen to explain the variations of camera work.
Figure 10:
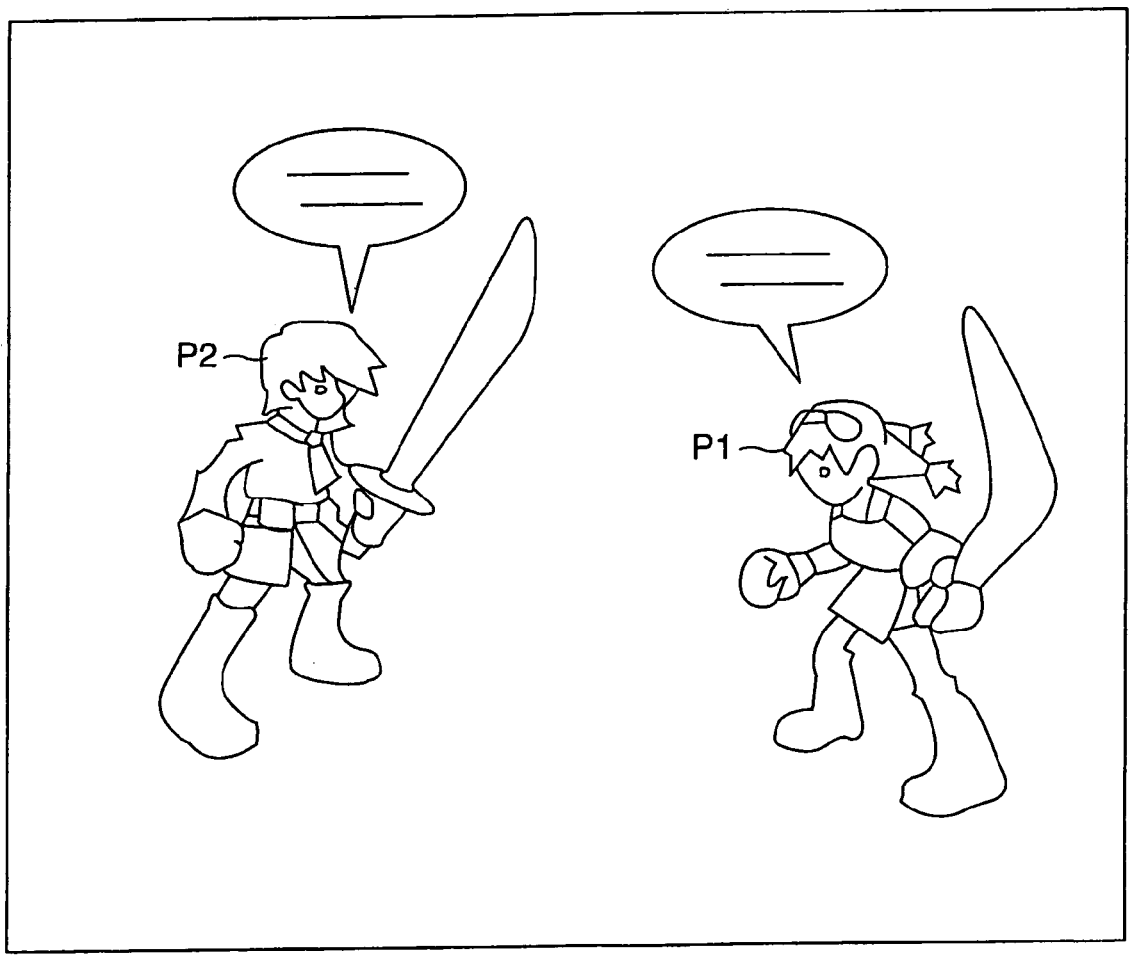
FIG. 10 is a diagram showing one game screen showing a conversation scene displayed.
Figure 11:
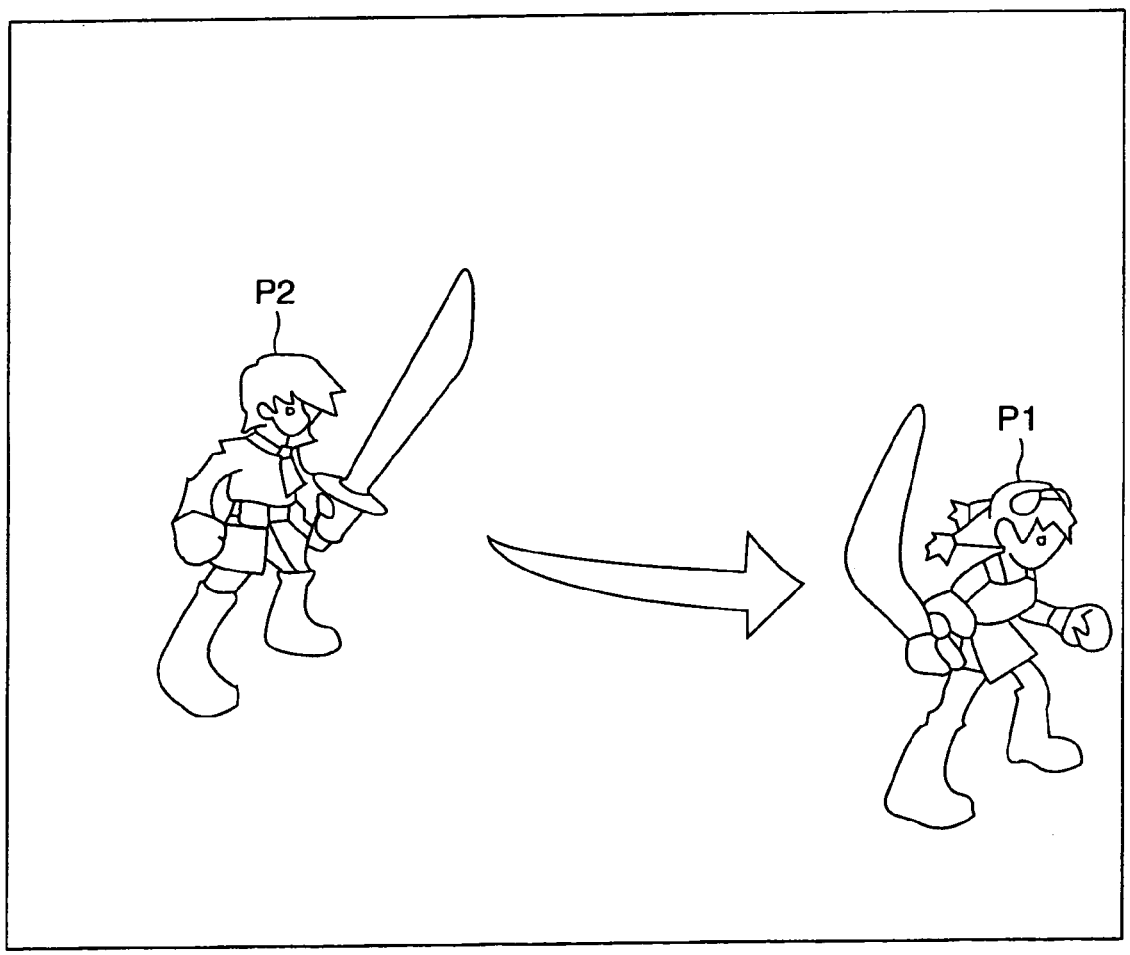
FIG. 11 is a diagram showing one game screen explaining the variation of camera work restoring a conversation scene to a former scene.

As shown in FIG. 9, when the conversation command is given, the game device firstly displays the game screen zooming in the characters, especially the player character P2 that is given the command. Moreover, it displays a game image that looks as if the player character P1 moved in from the outside. (STEP 701). The characters which cannot be given any commands (in this case, the player character P1) are sometimes called non-player characters (NPC) Secondly, in order to add much to the production of the conversation scene, the game device changes the camera work and displays the game screen as shown in FIG. 10. In short, the game images before and after the conversation scene express the same virtual three-dimensional space and the game device changes the camera work in order to change the game screen. The conversation between the characters can be displayed in a balloon or at the lower part of the game screen. Moreover, it can be displayed as a voice in accordance with the letter display on the game screen. Furthermore, as in FIG. 11, when the conversation is finished, the game device gradually changes the game image shown in FIG. 10 into the one which is zoomed out, which makes it look like the player character P1 is leaving for the outside (STEP 703). After that, the game device zooms out and displays the former game image shown in FIG. 8.

According to the present embodiment as mentioned above, it is possible to provide a game image in which new characters appear or disappear without a sense of incompatibility on the present game screen.

The next embodiment is now explained. The simulation game according to the present invention explained in this embodiment is implemented by using the aforementioned hardware (game device) shown in FIG. 2, and the content of the operation is, as the conventional simulation games, that 3 characters (A, B, C), each on a boat, select a weapon from a plurality of weapons loaded on the boat and respectively conduct attacks and defenses in turn. The purpose is to destroy the boat of the enemy by making attacks in the amount of 3 phases against the enemy character (the enemy boat) in turn. Here, 1 turn consists of 3 phases. The game device implements a game which includes a plurality of turns.

Figure 12:
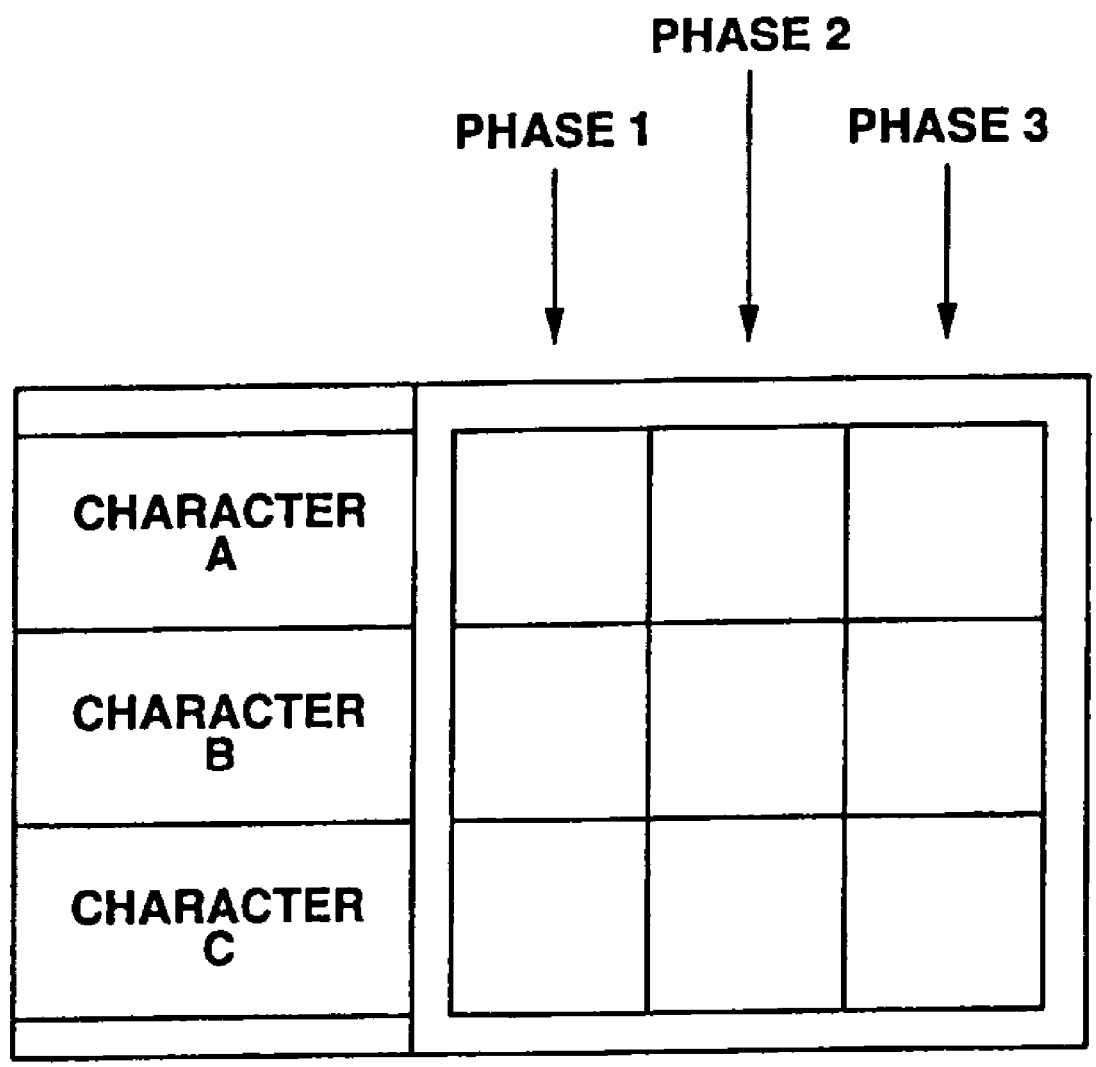
FIG. 12 is one operation screen according to the other embodiments of the present invention.

FIG. 12 shows the operation screen for a player to give instructions to each character of attacks and defenses. As in FIG. 12, in the lattice of 3×3, which has the types of characters designated in the vertical column adjoining the lattice and each phase is indicated horizontally, the arms and shields mentioned hereafter are located and thus the content of the operation of each character in each phase is set. This operation screen is displayed on the monitor 4a in accordance with the game operation program by CPU 101's reading the data inside the CD-ROM.

Figure 13:
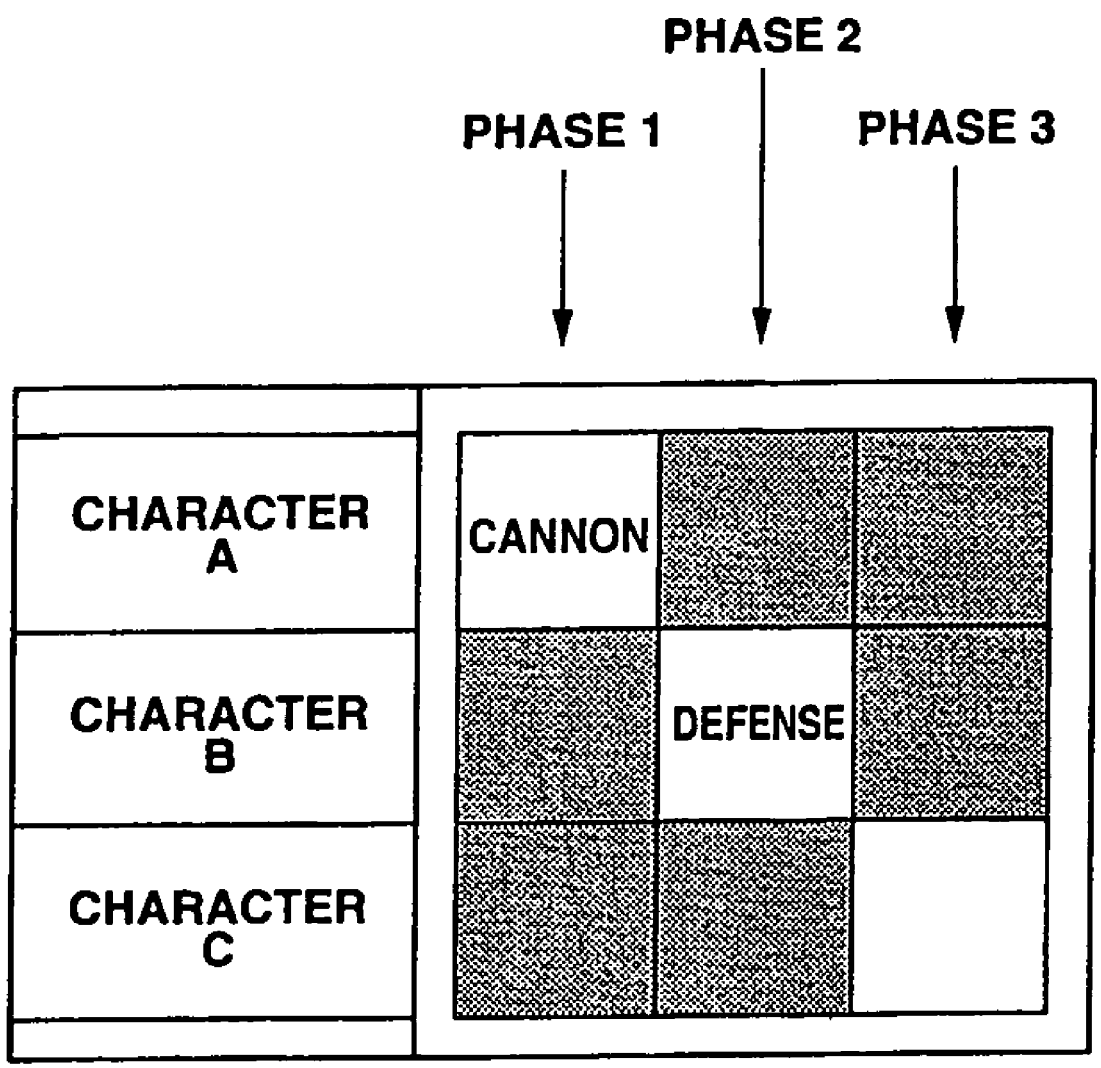
FIG. 13 is one operation screen according to the other embodiment of the present invention.

The characters A, B and C are arranged in the vertical column at the left side of the lattice shown in FIG. 12, and if character A makes an attack in phase 1, a weapon (a canon) is arranged in the box of the top left side of the 3×3 lattice as shown in FIG. 13. It is permitted to set a command for attack or defense for 1 character out of the 3 characters in each phase. This makes it impossible to set operations for characters B and C to make attacks or defenses in the phase 1, therefore, the lid-formed images (the shaded part in FIG. 13) are arranged in the middle and bottom left side boxes of phase 1. In phase 2, a command for defense is set for character B. In phase 3, a command for a machine gun (MG) is set for character C.

When the commands for weapons such as a canon or a MG are selected, and when a command for defense is selected, the operation of a character is determined by the data and the game program stored in the ROM. The CPU makes the player characters A, B and C respectively implement the predetermined operation (firing a canon, firing a MG, shielding to prevent enemies' bullets) in accordance with each command.

Figure 14:
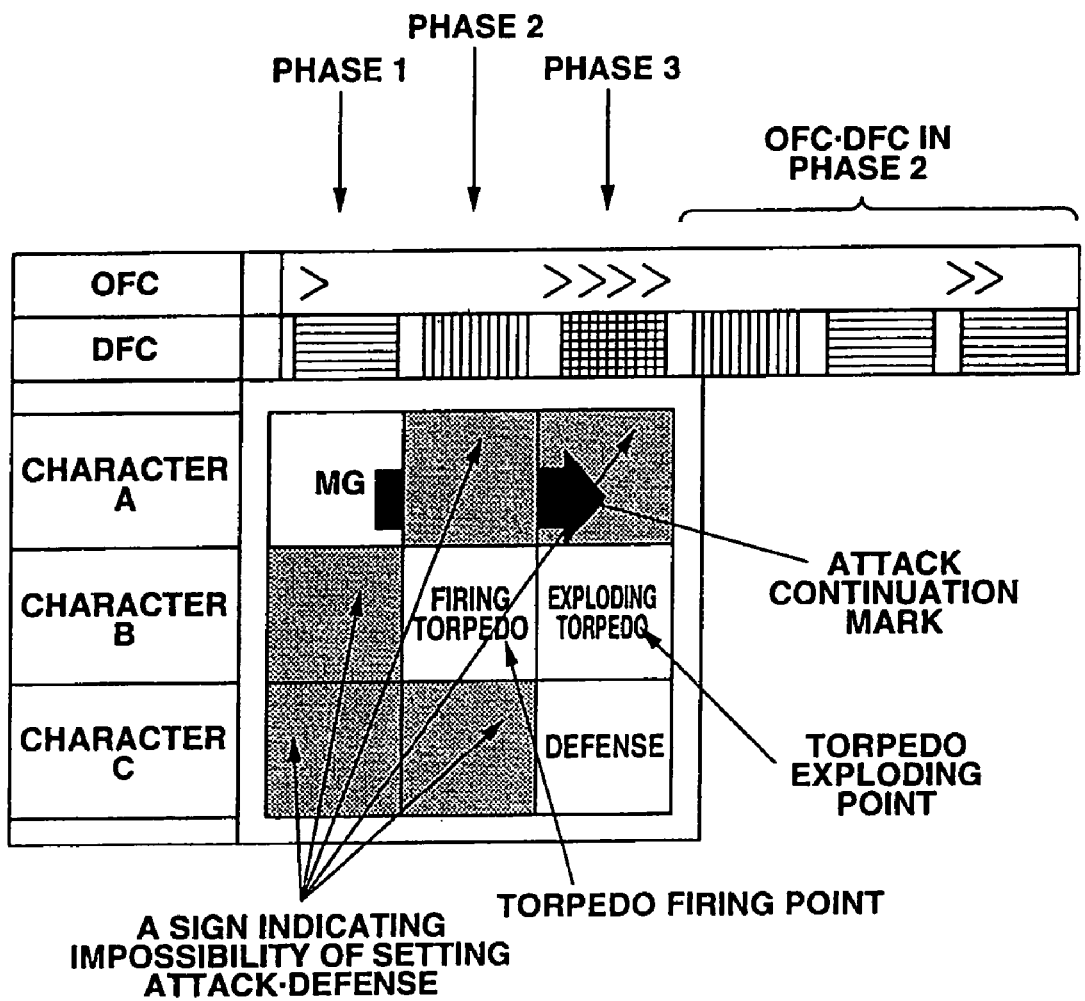
FIG. 14 is one operation screen according to the other embodiment of the present invention.
Figure 14:
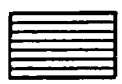
Figure 14:
Figure 14:
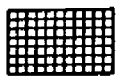

The characteristic of this embodiment is, as shown in FIG. 14, that a defense (DFC) display is included for each phase on the lattice, which shows whether the player characters, each character on each boat, are subject to the attacks from their rivals. This DFC is expressed in colors and patterns, for example, if a phase is expressed as shaded with horizontal lines, it indicates that the player character in the phase has a high durability against the enemy's attacks, if a phase is expressed as shaded with vertical lines, it indicates that the player character in the phase has the usual durability, and if a phase is expressed as shaded with horizontal and vertical lines, then it indicates that the player in the phase has a low durability.

Furthermore, an offense (OFC) display is provided on and parallel to the DFC, which shows in which phase the offensive power of a player character becomes highest. The degree of the offensive power is set by the number of ">" as shown in the diagram. In this embodiment, a player can construct a good operation strategy by referring to the DFC display and OFC display. For example, in a phase where the offensive power is high, a strategy can be taken which attacks by using the arms of high offensive power, and in a phase where the defensive power is low, a strategy can be taken which does not attack but assumes a posture of defense.

However, if a phase of high offensive power and a phase of low defensive power happen to be a same phase in the conventional method, either defense or attack must be chosen, and if attack is chosen, for example, a player can cause great damages to the enemy but suffers from the tremendous damages, therefore the player can not gain a satisfying game result. There is also a defect that the player easily becomes bored because there are less strategic choices. This embodiment can solve such defects.

The characteristics of each phase (the size of the offensive or defensive power, etc.) is stored in ROM beforehand. When displaying the operation screen on the monitor, the CPU displays OFC and DFC and processes the development of a phase in accordance with the program to develop OFC and DFC.

The canons, torpedos, and machine guns (MG) etc. are the kinds of weapons on each boat which characters A, B and C manipulate. These arms are all different from one another, depending on its type, in the offensive power and the number of bullets that can be used in a phase. For example, a canon has the high offensive power but the number of bullets is limited, and a machine gun has the low offensive power but it is permitted to set a large number of bullets.

In addition to the settings described above, this embodiment allows various settings to be made for each weapon, for example, the settings where the attack can last for a fixed period of time (over a plurality of phases) from the beginning of the attack, and the setting where the time required for a bullet to reach its destination can be adjusted.

The setting of each weapon is as follows.

|  | Offensive power | Lasting power | Time to impact |
| --- | --- | --- | --- |
| Canon | High | In 1 phase | In the same phase |
| Torpedo | Medium | In 1 phase | From the same phase to the next phase |
| Machine | Low | In 1~3 phases | In the same phase |

If a phase of high offensive power and a phase of low defensive power happen to be a same phase, and if it happens in phase 3, the player can set a machine gun for character A so that the character A continues firing the MG against its enemy character during 3 phases. In phase 2, the player can set a torpedo for character B so that the torpedo fired by character B impacts the enemy boat in phase 3. In phase 3, the player can apply a shield to character C so that the boat which these characters are on assumes a posture of defense. This allows the player in phase 3 not only to defend the characters from the attacks of the enemies by assuming a posture of defense but also causes effective damages to the enemies by setting the machine gun to continually fire from phase 1 and by setting the torpedo to fire in phase 2 and to impact the enemy boat in phase 3.

The characteristics of each weapon is stored in a table inside the ROM, and the CPU implements the operation control of each weapon according to the characteristics of these weapons and in accordance with the setting of the aforementioned operation screen. The described DFC and OFC displays continue in the following turns, so when the first turn is over, DFC and OFC of the second turn are shifted to the left for every 3 phases and displayed. This allows the player to make various fighting plans, such as elaborating a plan for the present turn while foreseeing the following turn.

In this embodiment, the attacks and defenses among characters A, B and C and the enemy boats are an example of the control of the relationship between the characters. The images of attacks and defenses are an example of images based on such relationship. The relationship between the characters consist of 3 phases. In short, 1 turn consists of 3 phases. In this embodiment, 1 turn means a period where all the characters, which a player can manipulate, finish the attacks or defenses against the enemy boats. 1 phase means a period where the settings of attacks or defenses can be made to 1 character and the character can implement such attacks and defenses. The contents of defenses differ depending on a weapon which is chosen. OFC and DFC are an example of the characteristics concerning the relationship among the characters which are set for each phase.

These characteristic values are displayed in the display frame for not only the phase presently developing but also the phase which is developed next. The player can check the characteristic values and chooses a predetermined weapon, or choose a defensive mode instead of an attack mode. The CPU produces an image of attacks or defenses according to the input which the player provides to the inputting means for the above choices.

Regarding the conventional game devices, attacks and defenses finish in 1 phase and do not extend to the following phase, however, this embodiment permits, depending on the type of a weapon, the influence of the attacks by the weapons to extend to the following phases. Therefore, the player can adjust the time required for the weapons to impact the enemy boat, and also can continue the attacks for a plurality of phases.

Other Embodiments

Each embodiment as mentioned above is an example that explains the present invention and there is no intention of limiting the present invention to these embodiments. The present invention can be executed in various forms as long as its gist is not deviated. For example, the actions of the means for realizing the aforesaid functions have been sequentially explained. However, it is not limited thereto. Therefore, as long as no contradictions are raised as for the movements, the processing order can be changed or concurrently operated.

According to the present invention, it is possible to provide a game image in which the characters unrelated to the commands given by the player also look as if they are moving.

Moreover, according to the present invention, it is possible to provide a game image in which new characters appear or disappear without a sense of incompatibility on the present game screen.

Furthermore, according to the present invention, there is a variety in the characteristics among the phases, and it is possible to provide an image processing device, particularly a game device, which has a variety in the development of the game scenes by providing the player a variety of responses in 1 phase, for example, the choices of weapons of various characteristics and the choices of attacks or defenses.

What is claimed is:

1. A game processing method in which a battle form is set in a lattice showing a plurality of phases for each of a plurality of player characters that can be manipulated by a player, wherein:

the phases each show a step of reciprocal attacks between an enemy character and each player character;

the plurality of phases constitutes 1 turn corresponding to a game stage for successive attacks conducted between the enemy character and each player character;

the type of an attack or defense is selectable in each phase in said 1 turn for each player character and displayed on the lattice, and wherein the type of the attack or defense is selectable in one phase for a particular player character to apply continuously into one or more of its following phases according to the type of attack or defense as selected in that one phase;

a defense display is provided on the lattice representing a determined defensive characteristic of each of the phases applied to the player characters, and an offense display is provided on the lattice aligned with the defense display representing a determined offensive characteristic of each of the phases applied to the player characters, the defense display and the offense display being determined independent of the player's selectable attack or defense for each player character in each phase; and a computer implements a changing of a degree of an attack or defense which corresponds to each phase in the lattice.

2. The game processing method according to claim 1, wherein when the type of attack or defense is selected in each phase in said 1 turn for each player character, an influence exerted by the type of the attack or defense on a plurality of phases can be set, and the influence exerted is selectable in one phase for a particular player character to extend to one or more of its following phases.

3. The game processing method according to claim 1, wherein an offensive power or a defensive power for all the player characters in each phase is set depending on the type of attack or defense set in each phase in said 1 turn for each player character.

4. A storage medium that stores a program for having a computer implement a game processing method in which a battle form is set in a lattice showing a plurality of phases for each of a plurality of player characters that can be manipulated by a player, wherein:

the phases each show a step of reciprocal attacks between an enemy character and each player character;

the plurality of phases constitutes 1 turn corresponding to a game stage for successive attacks conducted between the enemy character and each player character;

the type of an attack or defense is selectable in each phase in said 1 turn for each player character and displayed on the lattice, and wherein the type of the attack or defense is selectable in one phase for a particular player character to apply continuously into one or more of its following phases according to the type of attack or defense as selected in that one phase;

a defense display is provided on the lattice representing a determined defensive characteristic of each of the phases applied to the player characters, and an offense display is provided on the lattice aligned with the defense display representing a determined offensive characteristic of each of the phases applied to the player characters, the defense display and the offense display being determined independent of the player's selectable attack or defense for each player character in each phase; and a computer implements a changing of a degree of an attack or defense which corresponds to each phase in the lattice.

5. The storage medium that stores a program for having a computer implement the game processing method according to claim 4, wherein when the type of attack or defense is selected in each phase in said 1 turn for each player character, an influence exerted by the type of the attack or defense on a plurality of phases can be set, and the influence exerted is selectable in one phase for a particular player character to extend to one or more of its following phases.

* * * * *